(12) United States Patent
Surmann et al.

(10) Patent No.: US 10,137,742 B2
(45) Date of Patent: Nov. 27, 2018

(54) TIRE HAVING A DEVICE FOR GENERATING ROTATION-DEPENDENT SIGNALS

(71) Applicant: Benchmark Drives GmbH & Co. KG, Hofheim am Taunus (DE)

(72) Inventors: Frank Surmann, Rödermark (DE); Horst Walter, Hofheim (DE); Christian Wurmbäck, Bad Zwesten (DE)

(73) Assignee: Continental Bicycle Systems GmbH & Co. KG, Eschborn (DE)

( * ) Notice: Subject to any disclaimer, the term of this patent is extended or adjusted under 35 U.S.C. 154(b) by 84 days.

(21) Appl. No.: 15/327,793

(22) PCT Filed: May 13, 2015

(86) PCT No.: PCT/EP2015/060569
§ 371 (c)(1),
(2) Date: Jan. 20, 2017

(87) PCT Pub. No.: WO2016/012121
PCT Pub. Date: Jan. 28, 2016

(65) Prior Publication Data
US 2017/0217259 A1    Aug. 3, 2017

(30) Foreign Application Priority Data
Jul. 21, 2014 (DE) .......................... 10 2014 214 139

(51) Int. Cl.
*G01M 17/007* (2006.01)
*B60C 19/00* (2006.01)
(Continued)

(52) U.S. Cl.
CPC .......... *B60C 19/00* (2013.01); *B29D 30/0061* (2013.01); *B60C 13/00* (2013.01);
(Continued)

(58) Field of Classification Search
USPC ..................... 73/115.01, 115.07, 115.08, 146
See application file for complete search history.

(56) References Cited

U.S. PATENT DOCUMENTS

| | | |
|---|---|---|
| 2005/0057346 A1 | 3/2005 | Ogawa |
| 2007/0103285 A1* | 5/2007 | Konno ................... B60C 19/00 340/447 |

(Continued)

FOREIGN PATENT DOCUMENTS

| | | |
|---|---|---|
| DE | 602004001129 T | 11/2006 |
| EP | 2639085 A1 | 9/2013 |

(Continued)

*Primary Examiner* — Eric S McCall
(74) *Attorney, Agent, or Firm* — David L. Cate

(57) ABSTRACT

A tire, in particular cycle tire, with a device for generating rotation-dependent signals, in which the device is arranged in the tire or is connected to the tire and has a signal-generating element, which is held in a retaining element connected positively or non-positively to the tire body. The receiving element is arranged substantially on the outside of strengthening elements or reinforcing elements of the tire and the signal-generating element is held in the retaining element in such a way that the signal-generating element forms part of the outer surface of the tire or protrudes beyond the outer surface of the tire.

14 Claims, 4 Drawing Sheets

(51) Int. Cl.
  *B60C 13/00* (2006.01)
  *B29D 30/00* (2006.01)
  *B62J 99/00* (2009.01)
  *B62M 7/12* (2006.01)
  *G01P 3/487* (2006.01)
(52) U.S. Cl.
  CPC ............... *B62J 99/00* (2013.01); *B62M 7/12* (2013.01); *G01P 3/487* (2013.01); *B29D 2030/0077* (2013.01); *B60C 2019/004* (2013.01); *B60C 2019/005* (2013.01); *B60C 2200/12* (2013.01); *B62J 2099/002* (2013.01)

(56) References Cited

U.S. PATENT DOCUMENTS

| | | | |
|---|---|---|---|
| 2007/0222569 A1 | 9/2007 | Beranger et al. | |
| 2007/0272006 A1* | 11/2007 | Demaie | B60C 13/00 73/146 |
| 2010/0276044 A1* | 11/2010 | Heise | G01B 7/26 152/154.2 |
| 2015/0151593 A1* | 6/2015 | Mueller | B60C 23/0493 73/146.5 |
| 2016/0031272 A1* | 2/2016 | Peine | B60C 23/0408 340/442 |
| 2016/0075189 A1* | 3/2016 | Engel | B60C 11/246 340/438 |
| 2016/0243904 A1* | 8/2016 | Tanno | B60C 19/002 |
| 2017/0097223 A1* | 4/2017 | Darrer | G01B 7/26 |
| 2018/0072115 A1* | 3/2018 | Mueller | B60C 23/0447 |

FOREIGN PATENT DOCUMENTS

| | | |
|---|---|---|
| WO | 02068224 A1 | 9/2002 |
| WO | 2004058518 A1 | 7/2004 |

* cited by examiner

TIRE HAVING A DEVICE FOR GENERATING ROTATION-DEPENDENT SIGNALS

FIELD

The invention relates to a tire, in particular two-wheeled-vehicle tire, having a device for generating rotation-dependent signals, wherein the device is arranged in the tire or is connected to the tire and has a signal-generating element. A method for producing a two-wheeled-vehicle tire of said type, and a system for generating signals for the control of a two-wheeled-vehicle drive, are likewise disclosed.

BACKGROUND

Electric drives for two-wheeled vehicles, for example E-bike motors, and electronic bicycle tachometers normally require sensors for detecting the wheel or pedal rotations in order to determine, inter alia, the speed therefrom. These self-evidently include signal-generating devices for such sensors.

Normally, in systems of said type, magnets are provided as pulse generators (signal generators) for sensors in the form of reed contacts, Hall sensors or similar sensors. Every time the magnet passes the sensor, the tachometer, for example, receives an item of signal information, and from this calculates speed, distance, average speed, section distance etc. In the case of the E-bike with central motor, it is the case here for example in Europe that, with such systems, motor assistance is provided up to a limit of 25 km/h. In the USA, the maximum km/h value for assistance in the case of E-bikes is 32 km/h.

Normally, the signal-generating magnet is attached to a spoke in the front and/or rear wheel. This magnet is highly visible and adversely changes the design. The magnet can likewise twist, resulting in a loss of function. A spoke magnet of said type can, through negligence, easily twist or become lost, thus bringing the tacho and/or the entire E-bike drive system to a complete standstill. In the case of racing bikes, the spoke magnet generates a considerable increase in air resistance, and thus an additional disadvantage.

To solve the problem, it has already been considered to incorporate the magnet into the rubber of the tread or flank of a tire. In this regard, WO 2004/057274 A1 discloses a revolution counter for a bicycle, in the case of which a magnetic element is incorporated, in the plane of symmetry of a wheel, within the tire or within a hose situated in the tire. During every revolution of the wheel, the magnetic element moves through the capture area of a sensor which is fastened to the bicycle frame and which responds to magnetic induction, such that the rotations can be counted. The magnetic element may be adhesively bonded to the inner side of the tire or hose. Here, it is disadvantageously necessary for relatively thick magnets to be used in order to ensure sufficient permeability through the rubber layers of the tire or hose and generate a signal at the sensor.

If the magnet is enlarged to the point that an acceptable range is attained, the problem arises that, owing to the size, it becomes difficult for the magnet to be incorporated in the tire. A further problem is that the magnet is a foreign body in the rubber, and is sooner or later pushed through the surface as a result of the flexing work of the tire. Adequate functioning is thus lost. Furthermore, the tire may be damaged and become unusable. Functional tests with prototypes of various incorporated magnets have confirmed this.

DE 3911627A1 discloses a lighting system for bicycles, in the case of which permanent magnets are integrated in a wheel of the bicycle. In one embodiment, said permanent magnets are attached to the inner side of the tread of a tire and interact with a generator which is fastened to the frame of the bicycle. Here, there is the disadvantage that, during the introduction of permanent magnets into the rubber material of the tire, that is to say during the vulcanization, the magnetic characteristics can be adversely affected.

The heat required for the vulcanization of the tire (approximately 180° C. over 200 seconds) can reduce the energy value of the incorporated magnets, because magnets lose their magnetic action under intense heat. Magnets exist which can withstand such temperatures, but these have energy values too low to ensure reliable functioning.

DE 10 2010 042808 A1 discloses another solution, specifically a device for rotational speed detection having a magnet piece arranged on a valve of a hose, the trajectory of which magnet piece runs through the measurement region of a sensor attached to the frame. A disadvantage here, however, is the fact that the valve is seated centrally in the wheel rim and is thus relatively far remote from a sensor, which is for example in the form of a reed contact.

DESCRIPTION

For the invention, it was therefore the object to provide a two-wheeled-vehicle tire having a device for generating rotation-dependent signals, preferably for tachometers or for use in a control system for a motor-powered two-wheeled-vehicle drive, which two-wheeled-vehicle tire operates in as independent a manner as possible with respect to atmospheric influences or air resistance, is simple to produce or retrofit, and interacts in the most effective possible manner with the required sensors on the two-wheeled-vehicle frame.

This object is achieved by the features of the main claim. Further advantageous configurations are disclosed in the subclaims.

Here, the signal-generating element is received in a holding element which is connected in positively locking or non-positively locking fashion to the tire body, wherein the holding element is arranged substantially outside strengthening members or reinforcement elements of the tire, in particular outside the tire carcass, in or on the sidewall of the tire. The signal-generating element is received in the holding element such that the signal-generating element forms a part of the outer surface of the tire or projects beyond the outer surface of the tire.

The known two-wheeled-vehicle tire thus serves as a basis, regardless of dimensions. Existing vulcanization molds can be inexpensively modified, without completely new molds being produced.

Furthermore, the carcass and thus the tire construction and the characteristics thereof remain unchanged. The signal-generating element is securely and unalterably connected to a rotating part, cannot be twisted, and is very well protected against atmospheric influences. If the signal-generating element is attached to or in the tire in accordance with the invention, it is furthermore the case that the cables from the sensor, which is for example in the form of a reed contact, to the tacho or to the control unit are considerably shortened, which is reflected not only in the costs but also in shorter assembly times. Furthermore, the distance from the signal-generating element to the sensor is reduced to the smallest possible value.

An advantageous refinement consists in that the signal-generating element is received in an adapter, in particular an adapter composed of wear-resistant material, which adapter is in turn received in the holding element. One thus obtains a possibly wear-resistant, secure encapsulation, adapted to the usage situation, of the signal-generating element, which is of importance in particular if, in the context of a further advantageous embodiment, the signal-generating element is in the form of a relatively "soft" permanent magnet. In such an embodiment, it is then possible for the signal-generating element together with adapter to form a part of the outer surface of the tire, or to project beyond the outer surface of the tire.

A further advantageous embodiment consists in that the signal-generating element is detachably connected to the adapter, in particular is screwed to the adapter. It is thus possible for any worn signal-generating elements to be exchanged very easily. Also, in this way, it is possible for a signal-generating element which is for example in the form of a magnet to be easily exchanged for a stronger magnet in order to bridge a greater distance. This permits simpler and customer-specific solutions.

A further advantageous embodiment consists in that the material of the holding element corresponds to the tire material and is connected to the tire by vulcanization or adhesive bonding. This facilitates the production and ensures a secure and non-detachable connection. A cohesive combination of said type may be either integrated into the normal production process or particularly easily implemented in the case of retroactive mounting.

A further advantageous embodiment consists in that the holding element is in the form of a profiled part, profiled stud or sidewall reinforcement of the tire. With such an embodiment, the signal-emitting element and the holding element can be designed so as to be scarcely noticeable within the normal tire form/tire design.

A further advantageous embodiment consists in that the holding element is in the form of a bead or protective ring which at least partially surrounds the signal-generating element and possibly the adapter. It is thus possible for shearing off, for example against curbs, to be prevented. The bead or protective ring as a means for protecting against shearing off may be formed as a negative shape in the vulcanization mold. Said means for protecting against shearing off must, during traveling operation, be provided only toward the underlying surface, or at those points of the tire outer wall at which shearing off is possible.

A further advantageous embodiment consists in that the holding element, possibly adapter and signal-generating element form a spike. Known spikes have a plate-shaped root by way of which the spike is anchored in the tire and which has the greatest diameter of the spike parts. The root is normally connected by way of a neck part to a spike upper part, wherein the spike upper part is normally composed of a relatively thick spike part and of a relatively narrowed spike tip, which normally projects out of the surface/tread of the tire. All parts of the body incorporated into the tread are cylindrical, that is to say have two base surfaces which are parallel, planar, congruent and connected to one another by a shell surface. Here, the base surfaces may have different shapes, for example that of a circle, of a triangle, of a square, of a rectangle or of an oval.

In conjunction with the embodiment in which the signal-generating element is detachably connected to the adapter, in particular is screwed to the adapter, is also possible for the spike to be screwed together from two parts. The spike head itself then has a threaded bore in its shank. Said threaded bore serves for the screwing-in of a magnet, for example. The magnet is designed such that it can be screwed by way of a thread directly into the spike head. The shape and size are variable depending on the usage situation.

A further method, which is advantageous owing to its simplicity, for the production of a two-wheeled-vehicle tire according to the invention consists in that the signal-generating element, which is in particular in the form of a spike, possibly with adapter, is shot by way of a pistol into the holder already provided on the tire, as is also the case with conventional spikes which are arranged in the tread for the purposes of increasing grip on ice and snow.

The two-wheeled vehicle tire according to the invention can be used particularly advantageously in a system for generating signals for controlling the drive of a two-wheeled vehicle, wherein the two-wheeled vehicle has at least one two-wheeled-vehicle tire according to the invention, and wherein, on the frame of the two-wheeled vehicle, in particular on a fork, rear-end structure or swinging fork, a sensor is arranged in the vicinity of the two-wheeled-vehicle tire such that said sensor detects the rotation-dependent signals of the signal-generating element arranged in the two-wheeled-vehicle tire and provides said signals as input signals to the controller.

The tire according to the invention with its signal-generating element may self-evidently also readily be used for vehicles other than two-wheeled vehicles.

DESCRIPTION OF DRAWINGS

The invention will be explained in greater detail on the basis of an exemplary embodiment. In the drawings:

FIG. 1 shows a diagram of a two-wheeled-vehicle tire 1 on a wheel rim 10 in section, having a device 2 for generating rotation-dependent signals, wherein the device 2 is connected to the tire sidewall 9 by adhesive bonding. FIG. 2 shows a corresponding two-wheeled-vehicle tire 3 in section, wherein a device 4 for generating rotation-dependent signals is connected to the tire sidewall 7 by vulcanization.

FIG. 3 shows, likewise in section and in a diagram, an enlarged illustration of the embodiment. It is possible firstly to see the signal-generating element 6, which is in the form of a permanent magnet and received in an adapter 5, wherein here, the signal-generating element 6 together with the adapter 5 composed of wear-resistant material are received in a holding element 8 which is connected in non-positively locking fashion to the tire body or to the tire side wall 7 by vulcanization.

Figure 1:
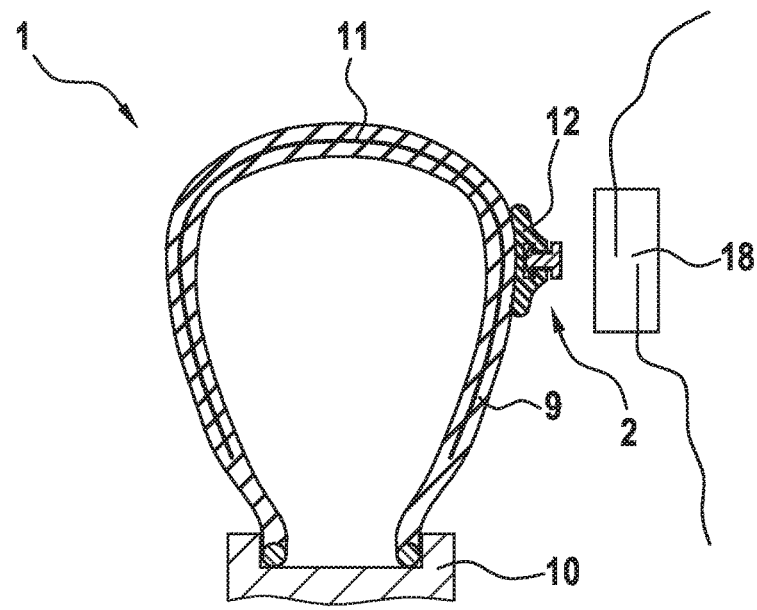
FIG. 1 shows a diagram of a two-wheeled-vehicle tire according to the invention with a device for generating rotation-dependent signals adhesively bonded thereon.

The holding element 8, like the holding element 12, is arranged, substantially outside the tire carcass 11, in or on the sidewall 7, 9 of the tire, and the signal-generating element 6 is received in the holding element such that the signal-generating element 6 projects beyond the outer surface of the tire. The material of the holding elements 8 and 12 corresponds to the sidewall material, that is to say is produced from rubber. Here, the holding elements 8 and 12 are in the form of sidewall reinforcements.

Figure 4:
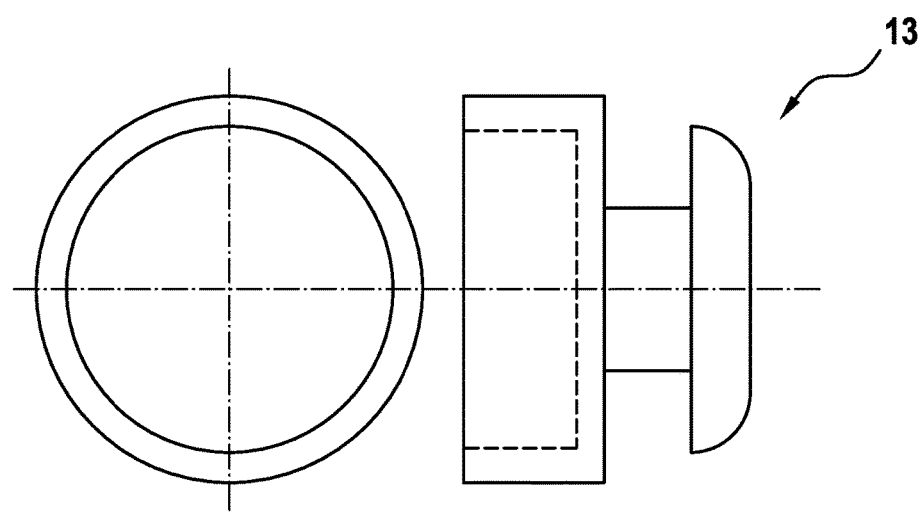
FIG. 4 shows a diagram of an adapter in an embodiment in which the holding element, adapter and signal-generating element form a spike.

FIG. 4 shows, in a diagram, a further adapter 13, in this case without an inserted magnet as signal-generating element, designed for an embodiment in which holding element, possibly adapter and signal-generating element form a spike.

Figure 5:
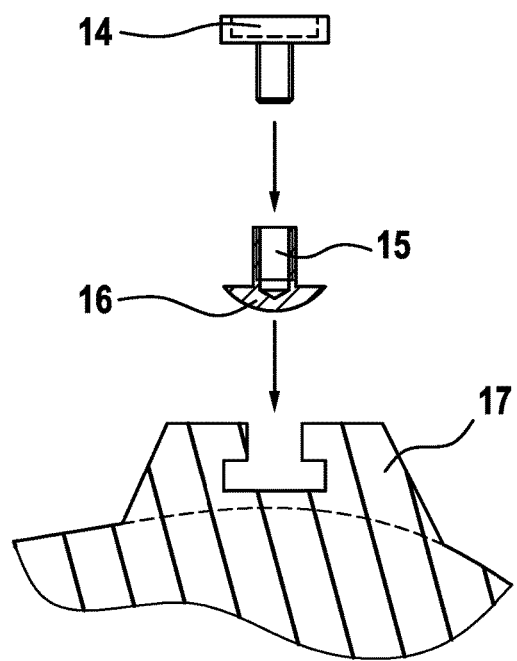
FIG. 5 shows a schematic diagram of an embodiment in which the signal-generating element is detachably connected to the adapter.

FIG. 5 shows, in a schematic diagram, an embodiment in which the signal-generating element 14 in the form of a magnet is connected detachably, specifically by way of screw action, to the adapter 15. Here, the signal-generating element 14 has an external thread on a part of its outer circumference, whereas the adapter 15 is equipped with an internal thread and with a thickened head 16 which can be screwed into the complementary recess of the holder 17.

This may also be performed in automated fashion. For this purpose, the adapter 15 and signal-generating element 14 are firstly screwed together. Thereafter, the part thus screwed together is shot into the recess of the holder 17 by way of a specially designed pistol.

Figure 2:
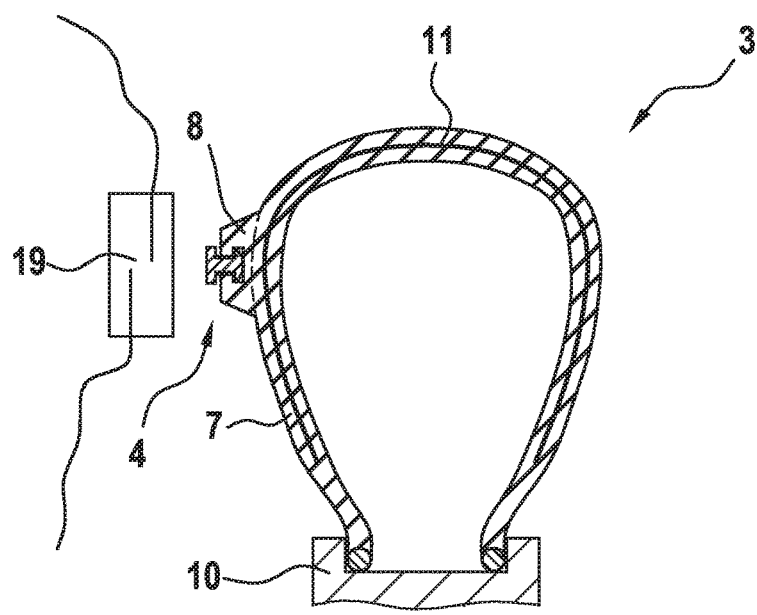
FIG. 2 shows a diagram of a two-wheeled-vehicle tire according to the invention with a device for generating rotation-dependent signals vulcanized therein.
Figure 3:
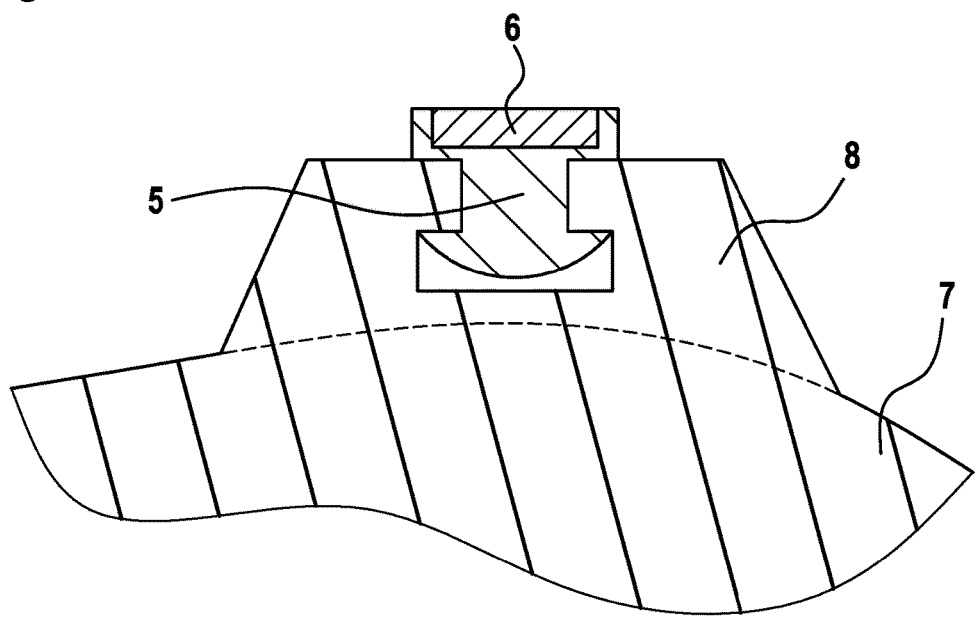
FIG. 3 shows a diagram of an enlarged illustration of the embodiment as per FIG. 2.

The entire system is indicated in FIGS. 1 and 2. The system, used on a two-wheeled vehicle (not illustrated in any more detail), has a two-wheeled-vehicle tire 1, 3 according to the invention and a sensor 18, 19 which is arranged on a fork or swinging fork (likewise not illustrated), which sensor detects the rotation-dependent signals of the signal-generating element and provides said signals as input signals to the controller.

Figure 6A:
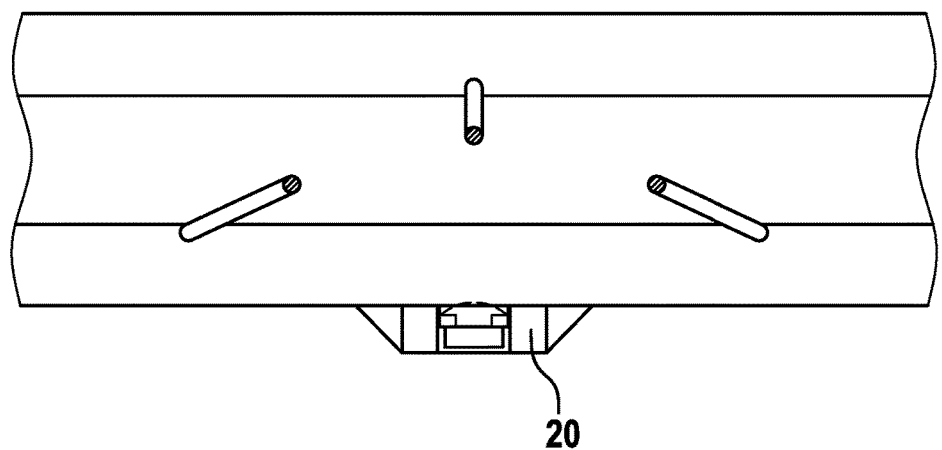
FIGS. 6a to 6c show an embodiment of a two-wheeled-vehicle tire according to the invention, in which the holding element is in the form of a bead or protective ring which surrounds the signal-generating element.
Figure 6B:
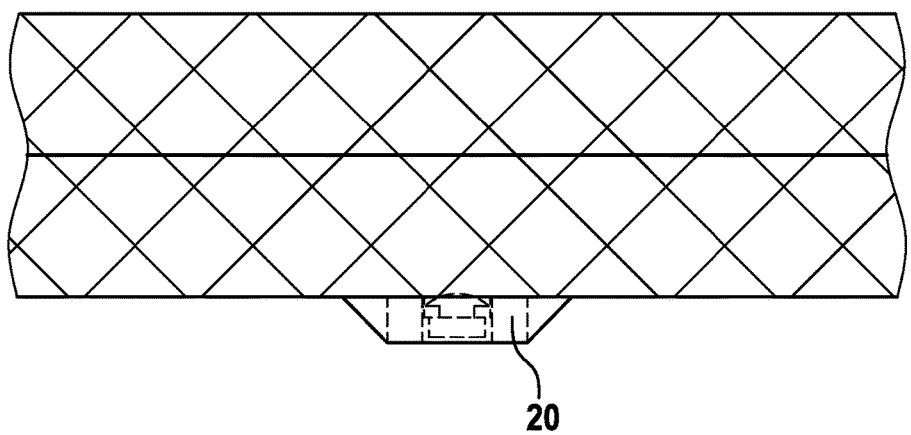
Figure 6C:
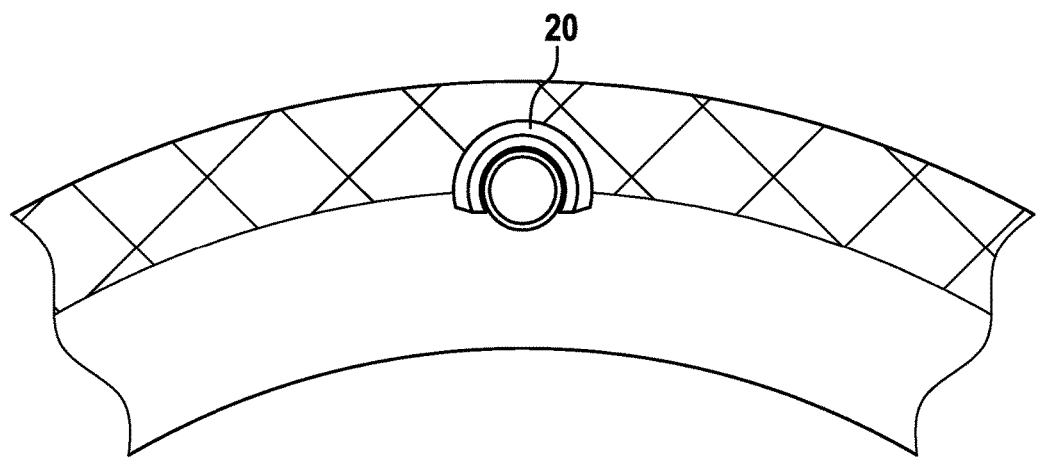

FIGS. 6a to 6c show an embodiment of a two-wheeled-vehicle tire according to the invention in which the holding element is in the form of a bead or protective ring 20 which partially surrounds the signal-generating element and the adapter. It is thus possible for shearing off, for example against curbs, to be prevented.

Here, FIG. 6c shows a side view of the two-wheeled-vehicle tire according to the invention, in which the bead 20 is arranged in the transition region between tread and side wall. In the embodiment shown here, the bead is arranged such that, as the two-wheeled-vehicle tire rotates, said bead is always oriented toward the underlying surface, such that any impacts against curbs or edges of road unevennesses does not lead to damage to the signal-generating element. FIG. 6b shows a view of the tread from above. In this case too, the projecting bead 20 can be clearly seen. FIG. 6a shows a view out of the wheel plane, that is to say a view toward the wheel rim from the wheel hub.

Said means for protecting against shearing off is, in this embodiment, during traveling operation, provided only toward the underlying surface, that is to say only at those points of the tire outer wall at which shearing off can actually occur.

LIST OF REFERENCE SIGNS

Part of the Description

1 Two-wheeled-vehicle tire
2 Device for generating rotation-dependent signals
3 Two-wheeled-vehicle tire
4 Device for generating rotation-dependent signals
5 Adapter
6 Signal-generating element
7 Tire sidewall
8 Holding element
9 Tire sidewall
10 Wheel rim
11 Tire carcass
12 Holding element
13 Adapter
14 Signal-generating element
15 Adapter
16 Thickened head of the adapter
17 Holding element
18 Sensor
19 Sensor
20 Bead or protective ring

The invention claimed is:

1. A method for producing a tire, the method comprising:
   providing a tire body having a holding element which is connected in positively locking or non-positively locking fashion to the tire body, wherein the holding element is arranged, substantially outside strengthening members or reinforcement elements of the tire; and,
   providing a signal-generating element which is received in the holding element such that the signal-generating element forms a part of the outer surface of the tire or projects beyond the outer surface of the tire;
   wherein the signal-generating element is shot by way of a corresponding pistol into the element holder.

2. The method as claimed in claim 1, wherein the holding element is in the form of one of a bead or protective ring which at least partially surrounds the signal-generating element.

3. The method as claimed in claim 1, wherein the signal-generating element comprises an adapter.

4. The method as claimed in claim 1, wherein the signal-generating element is in the form of a permanent magnet.

5. A system for controlling the drive of a two-wheeled vehicle, wherein the two-wheeled vehicle comprises at least one tire comprising a device generating rotation-dependent signals, wherein the device comprises a signal-generating element;
   wherein the signal-generating element is received in a holding element which is connected in positively locking or non-positively locking fashion to the tire body, wherein the holding element is arranged, substantially outside strengthening members or reinforcement elements of the tire;
   wherein the signal-generating element is received in the holding element such that the signal-generating element projects beyond the outer surface of the tire; and,
   wherein on a frame of the two-wheeled vehicle, a sensor is arranged adjacent the at least one tire such that the sensor detects the rotation-dependent signals of the signal-generating element arranged in the tire and provides the signals as input signals to a controller for controlling the drive of a two-wheeled vehicle.

6. The system as claimed in claim 5, wherein the sensor is disposed on one of a fork, a rear-end structure or a swinging fork, of the two-wheeled vehicle.

7. The system as claimed in claim 5, wherein the holding element is in the form of one of a bead or protective ring which at least partially surrounds the signal-generating element.

8. A tire comprising a device generating rotation-dependent signals:
   wherein the device comprises a signal-generating element;

wherein the signal-generating element is received in a holding element which is connected in positively locking or non-positively locking fashion to the tire body;

wherein the holding element is arranged, substantially outside strengthening members or reinforcement elements of the tire; and, wherein the device for generating rotation-dependent signals is disposed upon a sidewall of the tire.

9. The tire as claimed in claim 8, wherein the signal-generating element is received in an adapter which is received in the holding element.

10. The tire as claimed in claim 9, wherein the signal-generating element is detachably connected to an adapter.

11. The tire as claimed in claim 8, wherein the signal-generating element is in the form of a permanent magnet.

12. The tire as claimed in claim 8, wherein the holding element is connected to the tire by vulcanization or adhesive bonding.

13. The tire as claimed in claim 8, wherein the holding element is in the form of one of a profiled part, profiled stud or sidewall reinforcement of the tire.

14. The tire as claimed in claim 8, wherein the holding element is in the form of a bead or protective ring which at least partially surrounds the signal-generating element.

\* \* \* \* \*